United States Patent [19]

Mosijowsky

[11] 4,077,511
[45] Mar. 7, 1978

[54] TREE AND SHRUB FEEDER

[76] Inventor: Michael B. Mosijowsky, R.D. No. 2, Barnes Rd., Vermilion, Ohio 44089

[21] Appl. No.: 669,088

[22] Filed: Mar. 22, 1976

[51] Int. Cl.$^2$ .................. A01G 29/00; B65D 83/00
[52] U.S. Cl. .................................. 206/.5; 47/48.5; 137/268; 239/310; 23/267 R
[58] Field of Search .................. 47/48.5; 137/268; 23/267 A, 272, 267 B, 267 E, 267 R; 71/64 A; 239/60, 310, 10, 316; 206/.5

[56] References Cited
U.S. PATENT DOCUMENTS

| | | | |
|---|---|---|---|
| 3,005,287 | 10/1961 | Dudley | 47/48.5 X |
| 3,319,379 | 5/1967 | Groeber et al. | 47/48.5 |
| 3,755,965 | 9/1973 | Emery | 71/64 A X |
| 3,755,966 | 9/1973 | Smith | 47/48.5 |
| 3,804,331 | 4/1974 | Levey | 239/60 X |
| 3,821,863 | 7/1974 | Chan | 47/48.5 |
| 3,845,902 | 11/1974 | DeLamater | 137/268 X |

Primary Examiner—Edgar S. Burr
Assistant Examiner—Steven A. Bratlie
Attorney, Agent, or Firm—Clarence A. O'Brien; Harvey B. Jacobson

[57] ABSTRACT

An upwardly opening outer receptacle is provided having upstanding side wall portions and closed at its lower end by means of a bottom wall. An upwardly opening inner receptacle having upstanding side wall portions and closed at its lower end by means of a bottom wall is supported within the outer receptacle with the bottom wall of the inner receptacle spaced above the bottom wall of the outer receptacle. The outer and inner surfaces of the side wall portions of the inner and outer receptacles define corresponding circumferentially spaced portions disposed in surface-to-surface contact with each other and corresponding circumferentially spaced portions spaced from each other so as to define upstanding passages therebetween communicating with the space between the bottom walls at their lower ends and opening upwardly at their upper ends. The side wall portions of the inner receptacle include lower openings therein opening into the lower portions of the aforementioned passages and the contacting portions of the side walls of the inner and outer receptacles have registered openings formed therein spaced above the aforementioned lower openings. A closure wall closes the top or upper end of the outer receptacle and includes an upwardly projecting outer peripheral curb extending thereabout. The closure wall has drain openings formed therein registered with the upper ends of the aforementioned passages and the inner receptacle may have water soluble plant nutrient disposed therein.

9 Claims, 6 Drawing Figures

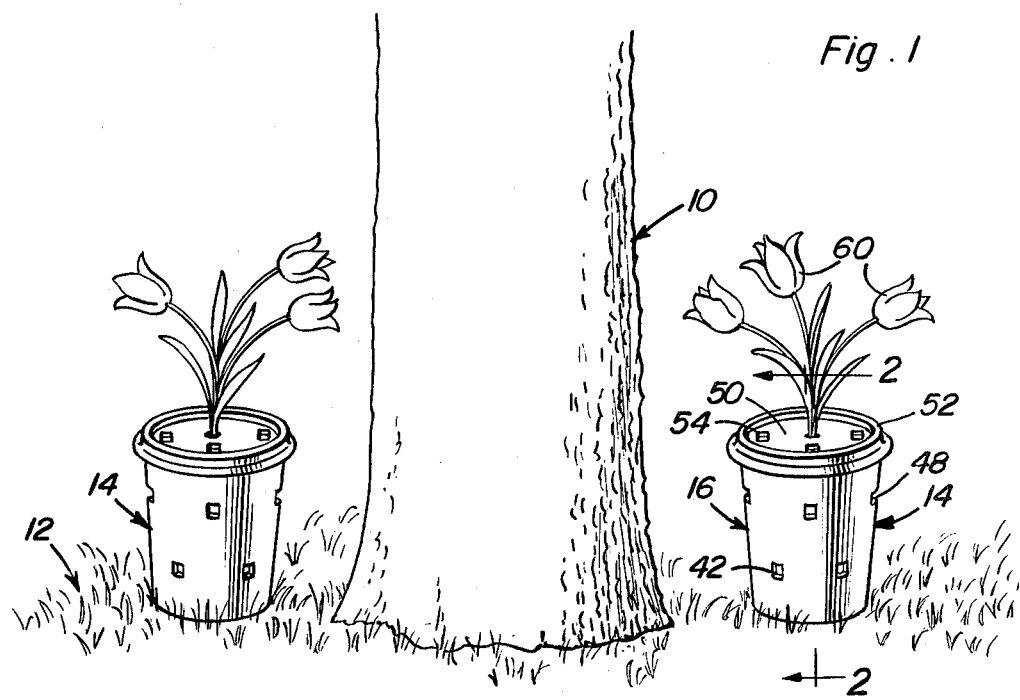
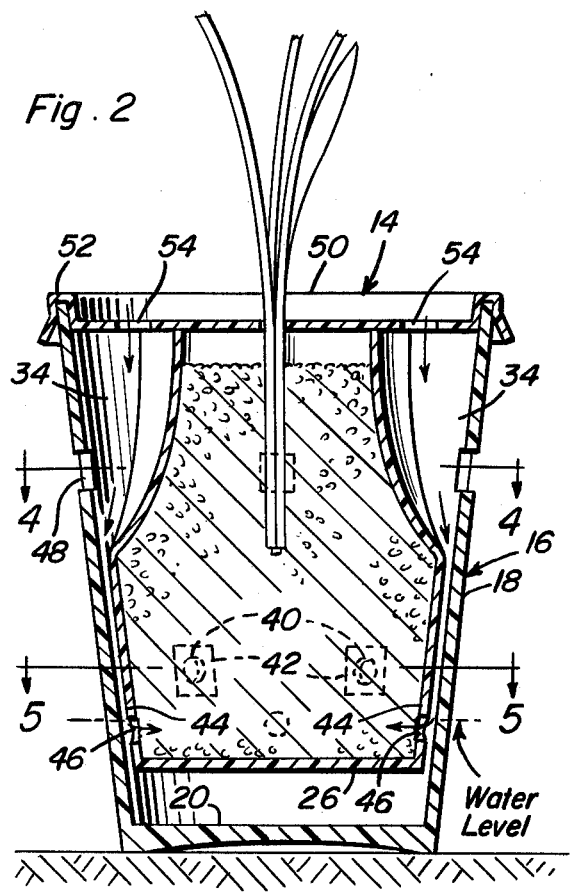
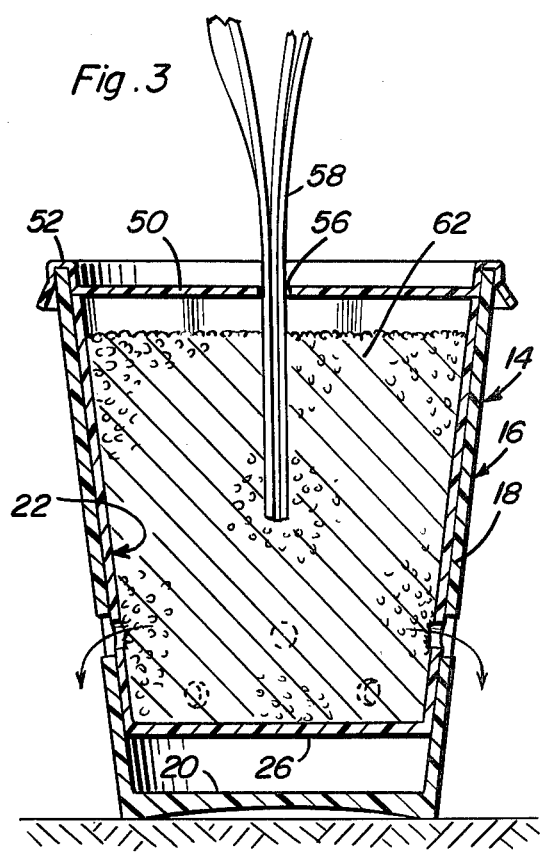

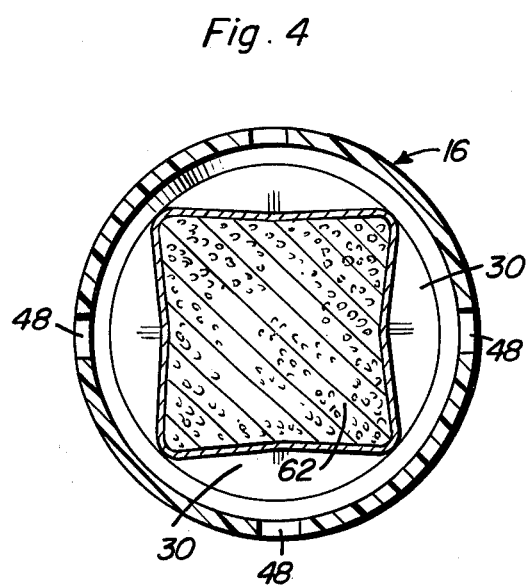
Fig. 4
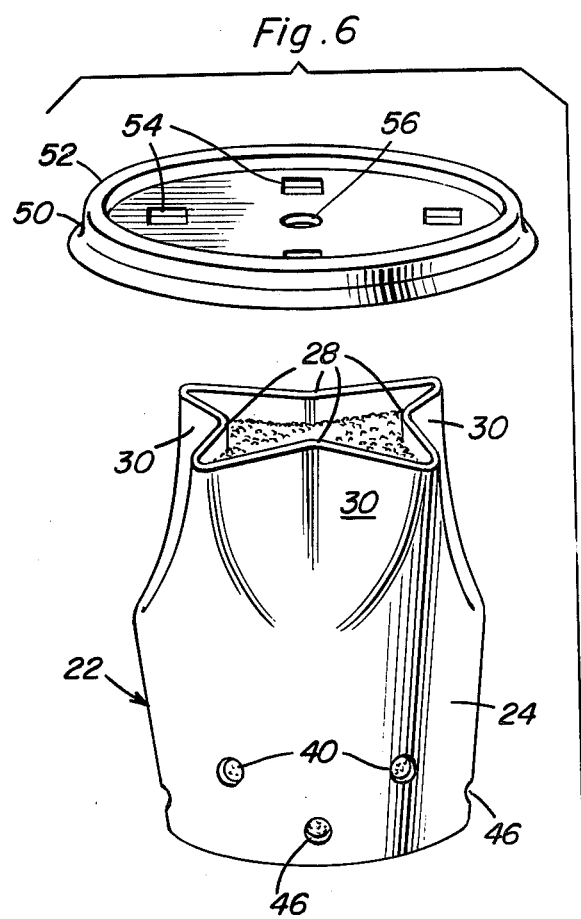
Fig. 6
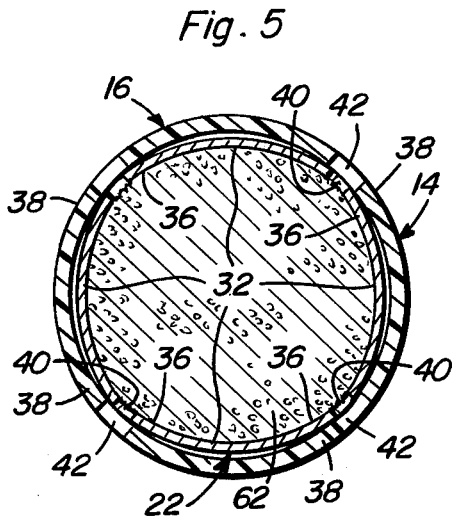
Fig. 5
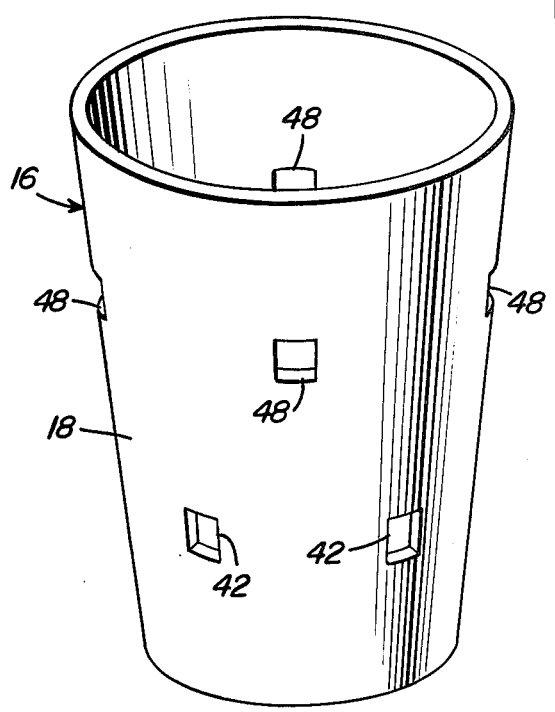

TREE AND SHRUB FEEDER

BACKGROUND OF THE INVENTION

Various forms of containers for fertilizer have been heretofore designed for positioning nearby and fertilizing, by leaching action, ground plants each time a rainfall is experienced. However, most of these previously known devices have been designed for embedding in the ground and are thus subject to flooding as a result of heavy rains.

Examples of previously patented ground plant fertilizing devices as well as other devices including some of the general structural and operational features of the instant invention are disclosed in U.S. Pat. No. 1,778,030, 1,992,878, 2,145,934, 3,188,771, 3,243,919 and 3,821,863.

BRIEF DESCRIPTION OF THE INVENTION

The tree and shrub feeder of the instant invention has been designed for placement on the ground about a grounded plant to be fertilized by leaching action in response to rainfall. In addition, the feeder is constructed in a manner whereby it presents a pleasing aesthetic appearance and also includes structure whereby it will not be flooded by a heavy rainfall so as to cause either over feeding of an associated ground plant or wasteful complete dissolving of the fertilizer contained therein.

The main object of this invention is to provide a ground plant feeder which will be capable of dispensing predetermined quantities of dissolved water-soluble fertilizer in proportion to the amount of rainfall each time it rains.

Another object of this invention, in accordance with the preceding object, is to provide a ground plant feeder for containing water-soluble fertilizer and including structural features which will substantially eliminate flooding of the feeder as a result of a heavy rain.

Still another very important object of this invention is to provide a feeder in which a supply of water-soluble fertilizer may be readily replenished.

A further object of this invention is to provide a feeder in accordance with the preceding objects and which is adapted to be placed on the surface of the ground adjacent a plant to be fed.

Still another object of this invention is to provide a feeder in accordance with the preceeding object and which will present a pleasing aesthetic appearance.

A final object of this invention to be specifically enumerated herein is to provide a feeder which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view illustrating a pair of feeders constructed in accordance with the present invention positioned on the ground adjacent a tree to be fed;

FIG. 2 is an enlarged fragmentary vertical sectional view taken substantially upon the plane indicated by the section line 2—2 of FIG. 1;

FIG. 3 is a vertical sectional view similar to FIG. 2 but with the feeder in position rotated 45° about a vertical axis in relation to the position of the feeder illustrated in FIG. 2;

FIG. 4 is a horizontal sectional view taken substantially upon the plane indicated by the section line 4—4 of FIG. 2;

FIG. 5 is a horizontal sectional view taken substantially upon the plane indicated by the section line 5—5 of FIG. 2; and FIG. 6 is an exploded perspective view of the feeder.

DETAILED DESCRIPTION OF THE INVENTION

Referring now more specifically to the drawings, the numeral 10 generally designates a tree and the numeral 12 generally designates the ground from which the tree 10 is growing.

A pair of feeders constructed in accordance with the present invention are generally designated by the reference numerals 14 and are positioned on the ground 12 on opposite sides of the tree 10. Although the feeders 14 are illustrated in closely spaced relation relative to the tree 10 it is to be understood that the feeders 14 will be normally placed considerably outwardly from the tree 10 and that more than two feeders 14 may be used to feed the tree 10.

Referring now more specifically to FIGS. 2 and 3 it may be seen that the feeder 14 of the instant invention includes an outer receptacle referred to in general by the reference numeral 16 including upstanding side wall portions 18 and closed at its lower end by means of a bottom wall 20. The feeder 14 also includes an inner receptacle referred to in general by the reference numeral 22 including upstanding side wall portions 24 and closed at its bottom by means of a bottom wall 26.

The open upper end of the inner receptacle 22 includes radially inwardly deflected upper marginal portions 28 defining outwardly opening recesses 30 spaced about the receptacle 22. The receptacle 22 may be initially constructed so as to be of circular cross section throughout its entire height and may then have its upper marginal portions inwardly deflected as at 28. The receptacle 22 is preferably constructed of foam plastic and is downwardly seated within the outer receptacle 16 in a manner which may best be seen from FIG. 3 of the drawings. However, and with attention now invited more specifically to FIGS. 2 and 5 of the drawings, as a result of the upper marginal portions of the inner receptacle 22 being inwardly deflected as at 28, corresponding lower portions 32 of the wall portions 24 are also inwardly deflected, but not to the extent of the upper marginal portions. Accordingly, vertically extending recesses or passages 34 are spaced about the inner receptacle 22 within the outer receptacle 16 and the lower ends of the passages 34 open downwardly into the space between the bottom walls 20 and 26 and the upper ends of the passages 34 open upwardly. Further, circumferentially spaced wall portions 36 of the inner receptacle 22 are disposed in tight surface-to-surface wedging contact with corresponding portions 38 of the wall portions 18. The portions 36 and 38 have registered small and large cross-sectional openings 40 and 42, respectively, formed therein and lower portions 44 of the wall portions 24 of the receptacle 22 have openings 46 formed therein opening into the lower ends of the passages 34. Further, the wall portions 18 have upper openings 48 formed therein registered with the recesses 30.

The upper end of the outer receptacle 16 is closed by means of a removable top wall 50 and the outer periphery of the top wall 50 includes an upwardly projecting and circumferentially extending inverted U-shaped curb 52 which is snugly telescoped down over the upper marginal portions of the wall portions 18 in order to frictionally retain the cover or top wall 50 on the receptacle 16. Further, the top wall 50 includes drain openings 54 formed therethrough spaced peripherally about the top wall 50 and registered with the recesses 30 in the upper ends of the passages 34. Also, the top wall 50 includes a central opening 56 downwardly through which the stalk portions 58 of artificial flowers 60 may be inserted.

In operation, a quantity of water-soluble fertilizer 62 is placed within the inner receptacle 22 and the latter is then wedged downwardly into the outer receptacle 16 with the openings 40 registered with the openings 42. Thereafter, the top wall or cover 50 may be secured over the upper end of the receptacle 16 and the stalks 58 of the artificial flowers 60 may be forced downwardly through the central opening 56 and into the fertilizer 62.

Then, each time it rains a portion of the rain water falling on the feeder 14 will be trapped within the confines of the curb 52 of the top wall 50 and will drain downwardly into the upper ends of the passages 34 through the openings 54. This water will flow downwardly through the passages and into the space between the bottom walls 20 and 26. As the quantity of water within the outer receptacle 16 increases it will flow into the bottom portion of the inner receptacle 22 through the openings 46 in order to dissolve some of the fertilizer 62 within the receptacle 22. Then, as the water level within the inner receptacle 22 increases it will reach the level of the openings 40 and flow outwardly therethrough and also through the openings 42 whereupon the fertilizer enriched water will flow downwardly along the outer sides of the outer container or receptacle 16 and onto the ground to be absorbed into the latter for feeding the tree by leaching action.

The operation of the feeder 14 is therefore extremely simple and it may be readily appreciated that the receptacle 22 may have a replenishing supply of fertilizer 62 placed therein merely by removing the cover or top wall 50. Further, the feeder 14 has a pleasing appearance and no matter how hard it rains only a certain portion of the watter falling onto the top wall 50 will pass downwardly through the openings 54. Of course, the size of the openings 54 may be varied in accordance with the amount of rainfall expected.

The foregoing is considered as illustrative only of the principles of the invention. Further, since numerous modifications and charges will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A tree and shrub feeder including an upwardly opening receptacle including upstanding side wall portions and closed at its lower end by means of a first bottom wall, said receptacle including wall means therein defining an upwardly opening compartment in said receptacle closed at its bottom by means of a second bottom wall spaced above said first bottom wall, said wall means and said side wall portions defining a plurality of peripherally spaced upstanding passages outwardly of said compartment and inwardly of said receptacle, said passages opening upwardly at their upper ends into the upper portion of said receptacle and downwardly at their lower ends into the space between said bottom walls, said wall means of said compartment including lower openings therethrough opening into lower portions of said passages, and said feeder including openings in said side wall portions and upper openings in said wall means of said compartment opening outwardly from the interior of said compartment above said lower openings to the exterior of said receptacle with said openings in said side wall portions and said upper openings not intersecting and being out of fluid communication with said passages, whereby liquid flowing outwardly from the interior of said compartment through said openings in said side wall and said upper openings will be prevented from mixing with liquid flowing downwardly through said passages and into said compartment through said lower openings, a closure wall closing the upper end of said receptacle, said closure wall defining an upwardly opening rain catch basin and having openings formed therethrough registered with the upper ends of said passages, said receptacle being adapted to receive water-soluble plant nutrient therein.

2. The combination of claim 1 wherein said closure wall is removably secured over the open upper portion of said receptacle.

3. The combination of claim 1 wherein said receptacle side wall portions defining the outer extremities of said upstanding passages include excess water drain openings formed therethrough spaced above the level of said upper openings.

4. A tree and shrub feeder including an upwardly opening outer receptacle having upstanding side wall portions and closed at its lower end by means of a bottom wall, an upwardly opening inner receptacle having upstanding side wall portions and closed at its lower end by means of a bottom wall, said inner receptacle being supported within said outer receptacle with its bottom wall spaced above the bottom wall of said outer receptacle, the outer and inner surfaces of the side wall portions of said inner and outer receptacles, respectively, including means defining circumferentially spaced upstanding passages therebetween communication at their lower ends with the space between said bottom walls and opening upwardly into the upper portion of said outer receptacle at their upper ends, the side wall portions of said inner receptacle including lower openings therein opening into lower portions of said passages and corresponding circumferentially spaced areas of said side wall portions of said inner and outer receptacles being disposed in surface-to-surface contact with each other, said corresponding areas of said side wall portions having registered openings formed therethrough spaced above said lower openings, whereby liquid flowing outwardly from the interior of said inner receptacle through said registered openings will be prevented from mixing with water flowing downwardly through said passages and into said inner receptacle through said lower openings, and a closure wall closing the upper end of said outer receptacle, said closure wall including an upwardly projecting outer peripheral curb extending thereabout and having drain openings formed therein vertically registered with the upper ends of said passages, said inner receptacle being adapted to receive water-soluble plant nutrient therein.

5. The combination of claim 4 wherein said receptacles are constructed of plastic material.

6. The combination of claim 4 wherein said curb defines a downwardly opening peripheral channel, the upper marginal edges of the upstanding side wall portions of said outer receptacle being frictionally seated in said channel.

7. The combination of claim 4 wherein the upper portions of circumferentially spaced upstanding side wall portions of said inner receptacle are deflected inwardly defining outwardly opening recesses spaced about the outer surfaces of the upper side wall portions of said inner receptacle.

8. The combination of claim 7 wherein said recesses define the upper extremities of said passages.

9. The combination of claim 8 wherein said curb defines a downwardly opening peripheral channel, the upper marginal edges of the upstanding side wall portions of said outer receptacle being frictionally seated in said channel.

* * * * *